No. 715,421. Patented Dec. 9, 1902.
J. REIF, Jr.
MACHINE FOR MAKING SLAT AND WIRE FABRIC.
(Application filed July 29, 1901.)
(No Model.) 7 Sheets—Sheet 1.

Witnesses:
Inventor:
J. Reif Jr.
By Price & Fisher
his Attorneys

No. 715,421. Patented Dec. 9, 1902.
J. REIF, Jr.
MACHINE FOR MAKING SLAT AND WIRE FABRIC.
(Application filed July 29, 1901.)
(No Model.) 7 Sheets—Sheet 2.

No. 715,421. Patented Dec. 9, 1902.
J. REIF, Jr.
MACHINE FOR MAKING SLAT AND WIRE FABRIC.
(Application filed July 29, 1901.)
(No Model.) 7 Sheets—Sheet 3.

Fig. 4.

Witnesses:
Inventor:

No. 715,421. Patented Dec. 9, 1902.
J. REIF, Jr.
MACHINE FOR MAKING SLAT AND WIRE FABRIC.
(Application filed July 29, 1901.)
(No Model.) 7 Sheets—Sheet 5.

No. 715,421. Patented Dec. 9, 1902.
J. REIF, Jr.
MACHINE FOR MAKING SLAT AND WIRE FABRIC.
(Application filed July 29, 1901.)
(No Model.) 7 Sheets—Sheet 7.

UNITED STATES PATENT OFFICE.

JOSEPH REIF, JR., OF HEBRON, INDIANA, ASSIGNOR TO HERCULES WOODENWARE COMPANY, OF CHICAGO, ILLINOIS, A CORPORATION.

MACHINE FOR MAKING SLAT-AND-WIRE FABRIC.

SPECIFICATION forming part of Letters Patent No. 715,421, dated December 9, 1902.

Application filed July 29, 1901. Serial No. 70,073. (No model.)

*To all whom it may concern:*

Be it known that I, JOSEPH REIF, Jr., a resident of Hebron, in the county of Porter, State of Indiana, have invented certain new and useful Improvements in Machines for Making Slat-and-Wire Fabric, of which the following is a full, clear, and exact description, reference being had to the accompanying drawings.

The present invention has relation to machines for forming slat-and-wire fabric, an example of this type being set forth in Letters Patent No. 609,387, granted to the Hercules Woodenware Company as assignee of Fisher and Reif, dated August 16, 1898.

One object of the present invention is to provide improved mechanism for supporting the wire coils and for feeding the wire to the machine.

Another object of the invention is to provide an improved construction of spindle, whereby the binding-wire is twisted about the slats.

A further object of the invention is to improve the dummy or spacing mechanism, whereby the spaces between the finished mats will be formed.

A still further object of the invention is to provide improved clutch mechanism, whereby the wire-twisting spindles are intermittently driven.

A further object of the invention is to improve the mechanism in certain details, all of which will be hereinafter described; and the invention consists in the features of improvement as specifically set forth in the claims at the end of this specification.

Fig. 3ª is a view showing a part of the main frame, the cam-wheel, and levers engaged thereby.

The main frame of the machine is similar in construction to that set forth in the Fisher and Reif Patent No. 609,387, above mentioned, and in the present machine, as in the machine of said patent, the slats from which the woven fabric will be formed will be supported in a stack at one side of the main frame and will be successively fed into the machine by an endless carrier or feed-chain.

Figure 3:
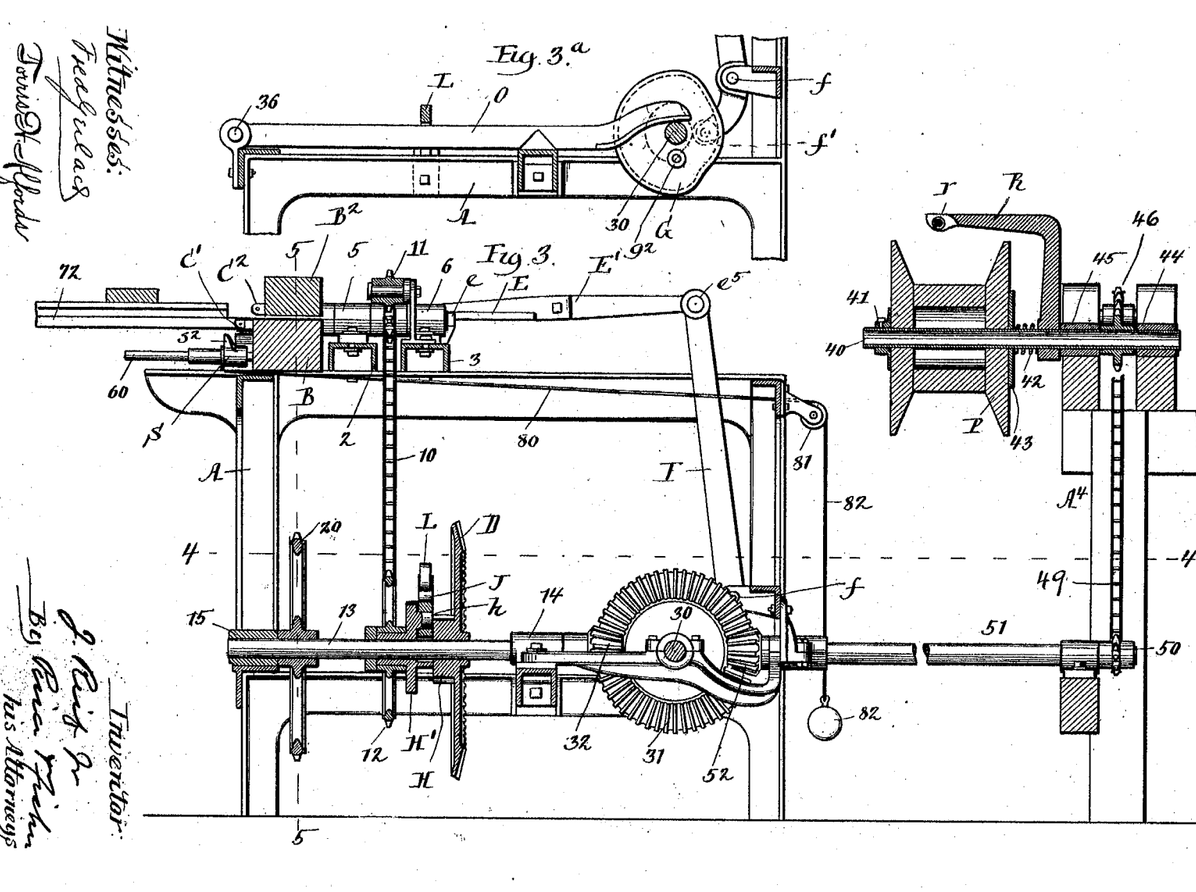
Fig. 3 is a view in vertical longitudinal section through the machine.

Upon the top A of the main frame is mounted a transverse table B, (see Fig. 5,) this table or a continuation thereof extending laterally to a distance beyond the main frame and serving as a support for the stack of slats W, that are held within a suitable rack formed of the vertical side bars V and front bar V'. Across the top of the main frame A and in front of the transverse table or support B extend the channel-bars 2 and 3, in the tops of which are formed slots 4, these channel-bars being bolted to the main frame at a short distance apart, as clearly shown in Figs. 1 and 3 of the drawings. Upon the channel-bars 2 and 3 are mounted the bearings 5 and 6, in which are journaled the tubular bodies C of the wire-twisting spindles, the bearings 5 and 6 being connected to the channel-bars 2 and 3 by bolts that extend through the longitudinal slots 4 of the channel-bars.

Each of the spindles is provided with a head comprising the two arms C' and C², these arms being preferably cast in piece with a hub C³, that fits over the end of the body portion C of the spindle and is firmly secured thereto. The tubular body C of the spindle is open at its ends for the passage therethrough of the main binding-wire X, the central opening $c$ at the rear end of the spindle coinciding with the channel $c'$, that is formed in the upper face of the arm $C'$. The end of the arm $C'$ is preferably furnished with a shoe or block $c^3$ of chilled steel, having an opening $c^3$ therein, through which the main binding-wire will pass. The arm $C^2$ of the spindle is formed with a channel $c^4$, the inner end of which communicates with a groove $c^5$, that is formed in the outer face of the body C of the spindle, this groove serving to receive the smaller or tie wire Y. At the end of the arm $C^2$ is journaled a steel antifriction-roll $C^4$, over which the tie-wire Y will pass, this roll serving to prevent the excessive wear upon the spindle.

Figure 4:
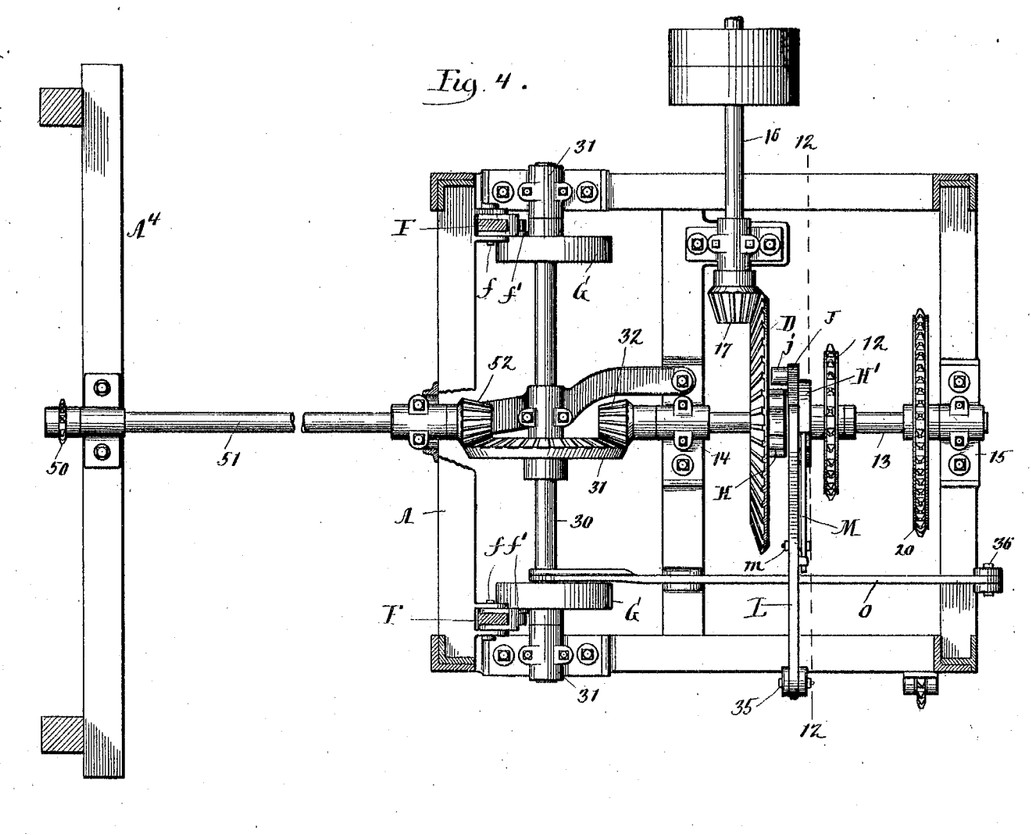
Fig. 4 is a view in horizontal section on line 4 4 of Fig. 3.

In the drawings two wire-twisting spindles are shown, and upon these spindles, between their front and rear bearings 5 and 6, are keyed the sprocket-wheels 8 and 9, over which passes a sprocket-chain 10, whereby the spindles are driven. The sprocket-chain 10 passes beneath an idler sprocket-wheel 11, suitably supported from the channel-bars 2 and 3 and passes around the sprocket-wheel 12, that is carried by (but not fixed to) the shaft 13, journaled in bearings 14 and 15 of the main frame of the machine. (See Figs. 3 and 4.) The shaft 13 is constantly driven from a power-shaft 16, to which it is connected by the beveled gear-wheel D and beveled pinion 17. To the shaft 13 is keyed a sprocket-wheel 20, around which passes the feed-chain 21, by which the slats W are successively advanced into the machine. The feed-chain 21 passes around idler sprocket-wheels 22, 23, and 24, journaled in the table B and frame, and that part of the table over which the feed-chain 21 passes is depressed or formed with a groove narrower than the width of the slats W, and above this groove will project the feed arm or lug 25, carried by one of the links of the chain and adapted to successively engage the ends of the slats W and advance them between the arms of the wire-twisting spindles.

Figure 1:
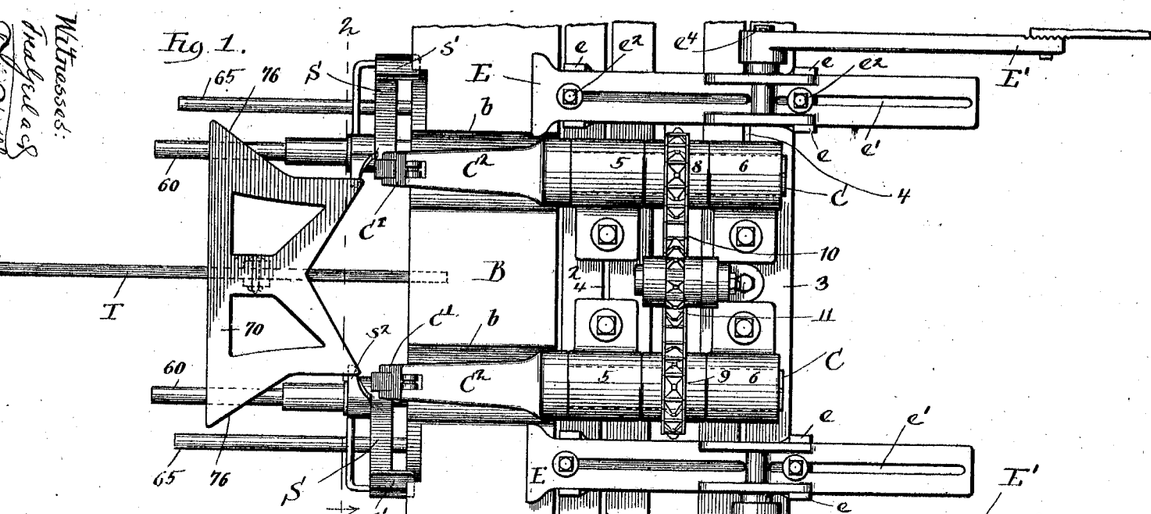
Figure 1 is a plan view of that part of the machine adjacent the wire-twisting spindles, the dummy mechanism, and the pushers.
Figure 2:
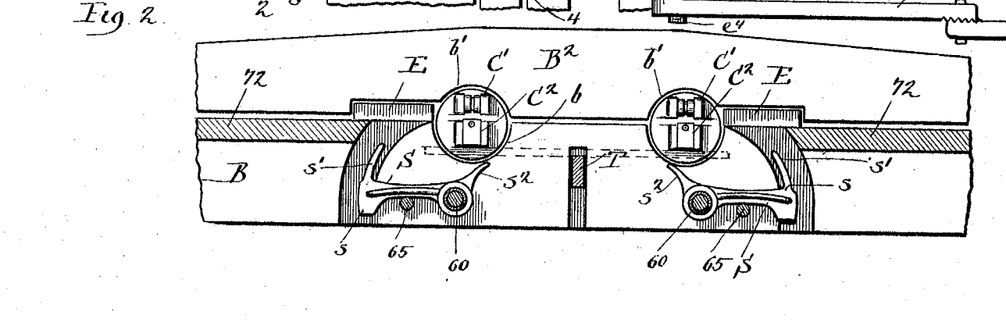
Fig. 2 is a view in vertical section on line 2 2 of Fig. 1.
Figure 5:
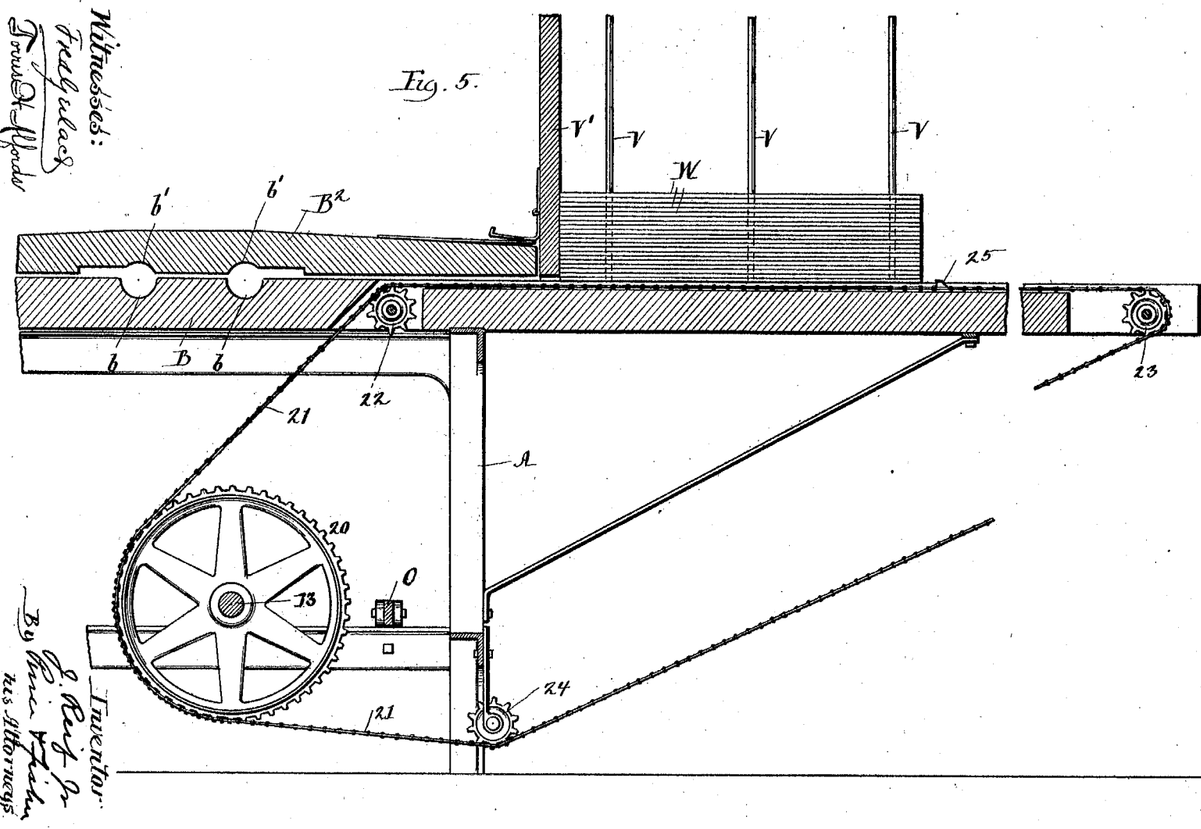
Fig. 5 is a view in vertical cross-section on line 5 5 of Fig. 3, certain parts being omitted and the endless slat-feeding chain being shown in elevation.
Figure 6:
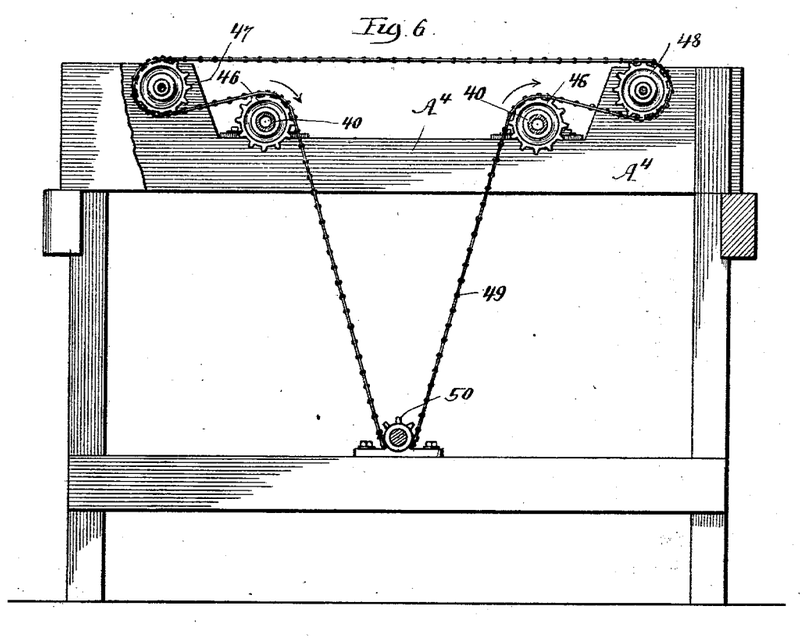
Fig. 6 is a view in front elevation, parts being broken away, showing the mechanism for driving the spools that carry the twisting-wire.
Figure 7:
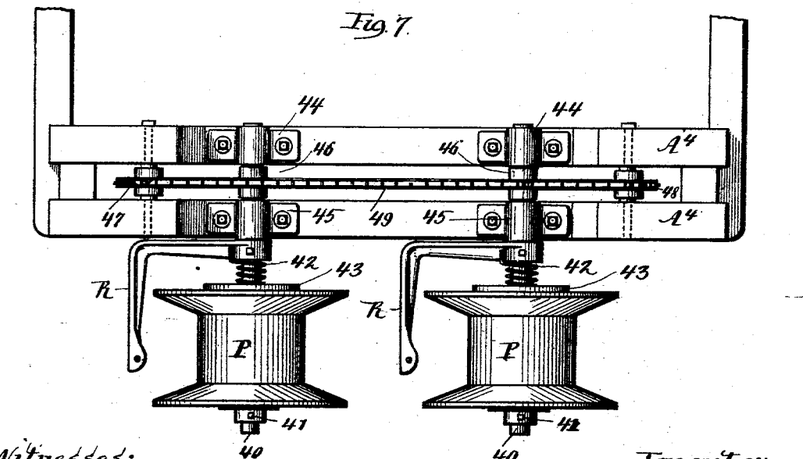
Fig. 7 is a plan view of the spools for the twisting-wire and mechanism for supporting and driving said spools.

By reference more particularly to Figs. 1, 2, and 5 of the drawings it will be seen that the table or support B is formed with cut-away spaces $b$, within which the arms $C'$ and $C^2$ of the spindles will revolve, and similar cut-away spaces $b'$ are formed in the under side of the presser-bar $B^2$, that extends above the table or support B. The bar $B^2$ is similar in construction to the presser-bar shown in the Fisher and Reif patent above mentioned and need not be more particularly described, the function of this bar being to insure the accurate guidance of the slats as they are advanced into the machine.

At the sides of the spindles C are mounted the pushers E, that are guided by lugs or bearings $e$, mounted on the top of the transverse channel-bars 2 and 3. (See Figs. 1 and 3.) These pushers E are provided with slots $e'$, through which pass the bolts $e^2$, that serve to retain the pushers in position. As shown, each of the pushers is provided with a laterally-projecting stud $e^4$, to which is connected an arm $E'$, the front ends of these arms $E'$ being pivotally connected, as at $e^5$, to the upper ends of the levers F, by which the pushers are operated. These levers F are pivoted, as at $f$, to lugs projecting from the main frame, and the lower ends of the levers will be furnished with laterally-projecting friction-rolls $f'$, adapted to enter cam-grooves formed in the sides of the cams G, as in the Fisher and Reif patent above mentioned. (See Figs. 3, $3^a$, and 4.) The cams G are mounted upon the transverse shaft 30, journaled in bearings 31 in the main frame of the machine, (see Fig. 4,) and upon this shaft 30 is keyed a beveled gear-wheel 31, that is driven by a beveled pinion 32, keyed to the forward end of the shaft 13.

From the foregoing construction it will be seen that when motion is imparted to the shaft 13 from the power-shaft 16 the feed-chain 21, driven by the sprocket-wheel 20, will successively advance the slats W over the table or support B and between the arms $C'$ and $C^2$ of the spindles, the positions of these arms $C'$ and $C^2$ being at such time as shown in Fig. 1 of the drawings. After the lowermost slat W has been thus advanced between the arms of the spindles the pushers E will be actuated by the levers F and cams G and will move the slats laterally from between the arms $C'$ and $C^2$ of the spindles. When the slats have been thus moved from between the arms of the spindles, rotation will be imparted to the spindles by the mechanism next to be described.

Figure 12:
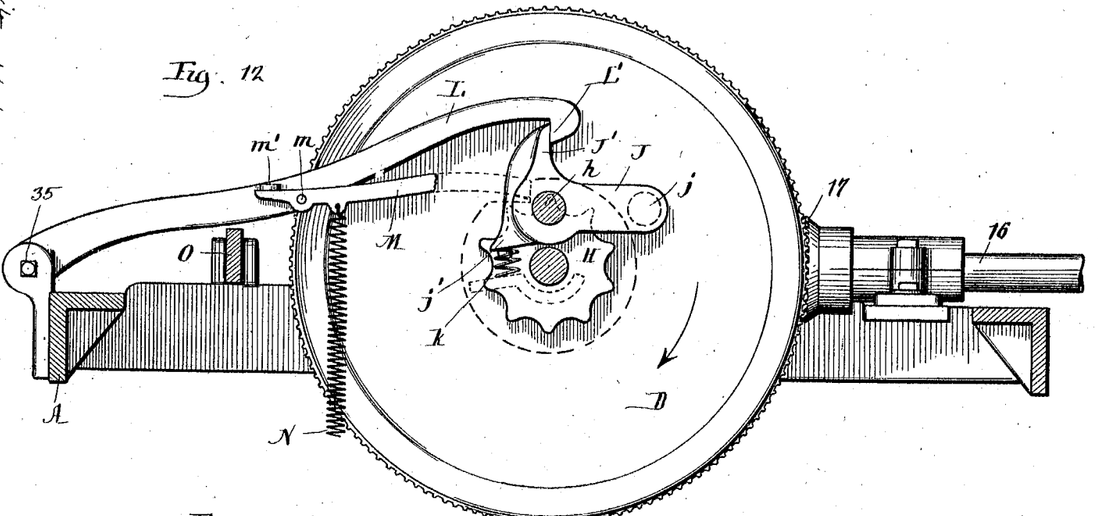
Fig. 12 is a view in vertical cross-section on line 12 12 of Fig. 4, parts being omitted.

Upon the hub of the beveled gear-wheel D (see Figs. 3, 4, and 12) is formed a scalloped clutch-wheel H, and adjacent this wheel and loosely mounted upon the shaft 13 is the clutch-disk $H'$, from which projects a stud $h$, whereon is pivotally mounted the clutch-dog J, having a laterally-projecting stud or arm $j$, adapted to engage with the scalloped surface of the clutch-wheel H. The clutch-dog J is formed with an arm or offset $j'$, against which will bear a coil-spring $k$, bearing against a plate or projection $h^3$, formed upon the face of the clutch-disk $H'$. This spring $k$ tends to force the offset arm $j$ of the dog J into engagement with the scalloped surface of the clutch-wheel H. The dog J is also formed with an engagement-arm $J'$, which at proper times will be caught by a lever L, which at such times serves to hold the dog out of engagement with the clutch-wheel H, as shown in Fig. 12 of the drawings. The clutch-disk $H'$ is provided with a shoulder $h^4$, adapted to be engaged with a supplemental stop or lever M, that is pivoted, as at $m$, to the lever L, the pivotal movement of the lever M being limited by a stop $m'$ on the side of the lever L, and a spring N serves to draw downward the lever L and the supplemental stop arm or lever M, to which it is connected. The lever L is pivoted, as at 35, to one side of the main frame, and its free end extends inwardly above the clutch-dog J, as clearly seen in Figs. 4 and 12 of the drawings. Below the lever L extends a lever O, that is pivoted, as at 36, to the main frame, and the free forward end of the lever O extends adjacent the inner face of one of the cams G, (see Fig. 4,) that is provided with a laterally-projecting stud $g^2$, by which the end of the lever O will be periodically lifted. The purpose of the lever O is to so lift the lever L as to free the hooked end L' of this lever from engagement with the arm J' of the clutch-dog J, thereby permitting the stud or offset $j$ of the clutch-dog to engage with the clutch-wheel H, and when the dog J is thus engaged with the clutch-wheel H it will partake of the rotation of the gear-wheel D and will in turn impart rotation to the clutch-disk H' and to the sprocket-wheel 12, that is keyed to the hub of the clutch-disk H', as clearly shown in Figs. 3 and 4 of the drawings. Now, inasmuch as the sprocket-wheel 12 is connected by the sprocket-chain 10 and sprocket-wheels 8 and 9 with the bodies C of the wire-twisting spindles, it is manifest that when the lever L is lifted and the clutch mechanism thrown into operation as last described rotation will be imparted to the spindles, so as to cause the wires carried by these spindles to be woven onto the slats.

Figure 13:
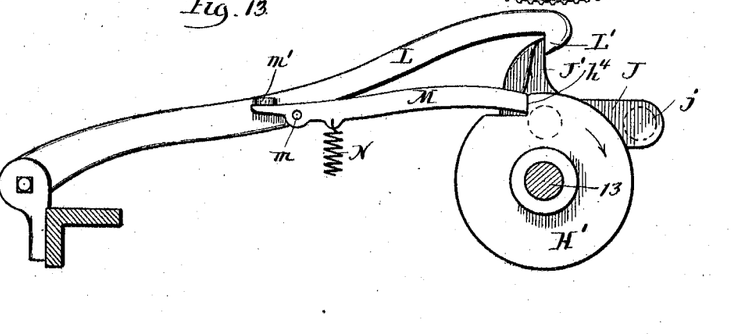
Fig. 13 is a detail view showing the clutch disk and dog and parts engaging therewith.
Figure 14:
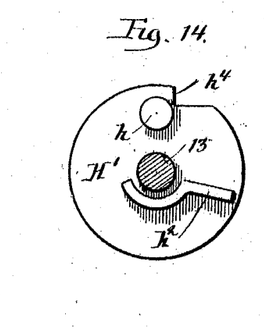
Fig. 14 is a detail view, in side elevation, of the clutch-disk.

The gear mechanism whereby the several parts above described are driven is so proportioned and the movements of the parts are so timed that after a slat has been fed between the arms C' and C² of the spindles by the feed-chain 21 the pushers E will be actuated and will move the slat laterally from between the arms of the spindles, and when this lateral movement of the slat has been accomplished the lever L will be lifted by the lever O and the clutch-dog J will cause the engagement of the clutch-wheel H with the clutch-disk H', thereby imparting rotation to the sprocket-wheel 12. As the sprocket-wheel 12 is revolved the chain leading from this sprocket-wheel will impart revolution to the wire-twisting spindles, thereby causing the binding-wire Y to be twisted around the main wire X at the front of the slat that has been previously moved laterally from between the jaws of the spindles by the movement of the pushers E last described. When the spindles have made the requisite number of revolutions, the stud $g^2$ upon the cam-wheel G (see Fig. 3ª) will pass from engagement with the free end of the lever O, thereby permitting this lever to drop and permitting the coil-spring N to draw downward the lever L and supplemental lever or stop M. (See Fig. 12.) When the lever L is thus drawn downwardly, its hooked end L' will be in position to engage the arm J' of the clutch-dog J and the free end of the supplemental lever or stop M will ride upon the rim of the clutch-disk H'. As the hooked end of the lever L engages the arm J' of the clutch-dog J it will draw it back to the position seen in Fig. 12, thereby withdrawing the arm or offset $j$ of the dog from engagement with the clutch-wheel H, and thus disengaging the sprocket-wheel 12 from the gear-wheel D and arresting the movement of the wire-twisting spindles. At the time that the clutch-dog J is thus withdrawn from action the free end of the supplemental lever or stop M will pass behind the shoulder $h^4$ of the clutch-disk H', as shown in Figs. 12 and 13 of the drawings, and will serve to prevent any backward movement or recoil of the disk that might otherwise tend to disturb the proper position of the spindles for receiving the next slat.

The main wires X, that pass centrally through the wire-twisting spindles, also pass through tubular supports 40 for the spools P, whereon the binding-wires or tie-wires Y will be carried. The main wires X will be received from suitable reels or spools (not shown) at the front of the machine. The spools P for the tie-wires are suitably held upon the tubular supports 40 by set-screws 41 or by other convenient means that will allow the spools to be withdrawn from the supports when the spools are to be refilled. The spools P are not keyed to the supports 40, but are connected therewith by a frictional engagement, so that a slip movement may occur between the spools and the support as the wire is unwound from the spools. As shown, there is mounted upon each of the supports 40 a guide-arm R, having an end extending over its corresponding spool P, and preferably the end of the guide-arm R is provided with an eye or with an opening having a friction-roll $r$, over which the tie-wire Y will pass. Between the hub of the arm R and the corresponding spool P is interposed a coil-spring 42, and preferably also a friction-plate 43, the purpose of this spring and plate being to insure a gradual turning of the spool P as the tubular support or shaft 40 is turned, so as to cause the turning of the spool constantly in the same direction as that in which the wire-twisting spindles are revolved. Each of the supports 40 is shown as journaled in suitable bearings 44 and 55, and to each support or shaft 40 is keyed a sprocket-wheel 46. The bearings 44 and 45 are mounted in a suitable frame A⁴, that is located at the front of the main frame, and in this frame are mounted the idler sprocket-wheels 47 and 48, around which passes a sprocket-chain 49, that passes also around the sprocket-wheels 46 of the tubular shafts or supports 40 and around a sprocket-wheel 50, that is keyed to the front end of a shaft 51, the rear end of which is journaled in a bearing on the main frame A and is provided with a beveled gear-pinion 52, that meshes with beveled gear-wheel 31 on the counter-shaft 30. (See Figs. 3 and 4.) Inasmuch as the shaft 51 is in engagement with a constantly-revolving gear-wheel 31 it is obvious that the spools P, that carry the tie-wires Y, will be constantly revolved, and this revolution of the spools will be in the same direction as the revolution of the wire-twisting spindles; but inasmuch as the revolution of the spindles is intermittent, while the revolution of the spools P is constant, the spools P must revolve at a slower speed, so as to accomplish only the same number of revolutions as the spindles. Hence it will be seen that while the spindles are at rest and while a slat is being fed between the arms $C'$ and $C^2$ of the spindles and while the slat is being moved laterally by the pushers E, as hereinbefore described, the spools P will be revolving and will be loosely wrapping the tie-wires or binding-wires Y around that portion of the main wires X between the front ends of the spindles and the tubular supports or shafts 40. As soon, however, as the clutch mechanism is thrown into action, so as to cause the wire-twisting spindles to revolve, these spindles will move at such speed in excess of the speed of revolution of the spools P as to unwind the several wraps that have been given to the tie-wires Y about that part of the main wires X in front of the wire-twisting spindles. When the spindles are again at rest, the continuous revolution of the spools P and the guide-arms R will cause the binding-wires or tie-wires Y to be again loosely wrapped around that portion of the main wire X in front of the spindles, these wraps being taken up by the more rapid revolution of the spindles when they are again revolved.

Figures 8, 9, 10, 11:
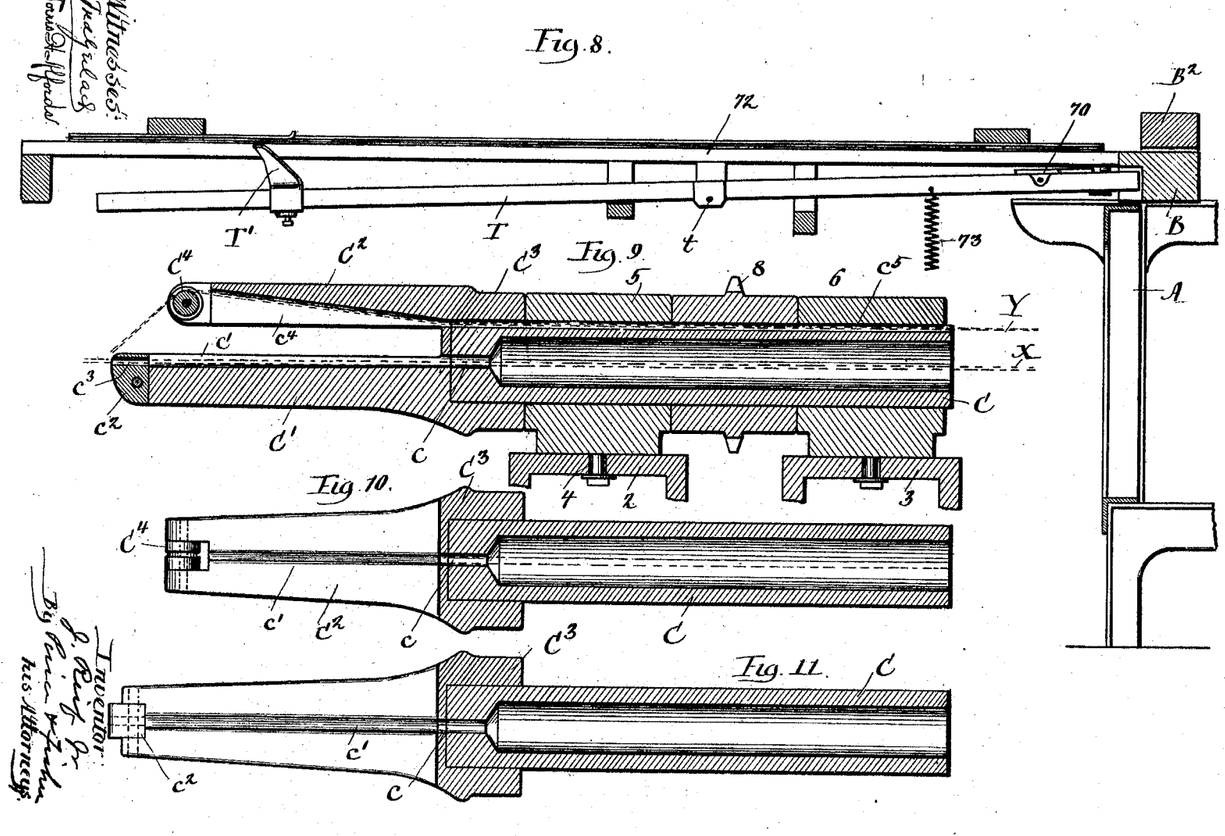
Fig. 8 is a view in vertical longitudinal section through the table at the rear of the machine and through the rear part of the main frame, parts being shown in elevation.
Figs. 9, 10, and 11 are detail views in section of the wire-twisting spindle.

This machine, like the machine set forth in the Fisher and Reif patent above mentioned, is more especially designed for weaving the slat-and-wire mats whereof the bodies of barrels will be formed, and it is therefore desirable that provision be made whereby the mats will be spaced or divided into suitable lengths for the formation of the barrel-bodies. To accomplish this division of the mats into suitable lengths, I provide the improved construction of "dummy mechanism" next to be described. From the table or support B project rods 60, on which are pivotally mounted the dummies S, these dummies having extended hubs or bearings to insure their easy movement along the rod. Each of the dummies S is provided with a head $s$, adapted to rise above the surface of the table B, and preferably also with a blade $s'$, adapted to pass between the arms $C'$ and $C^2$ of the wire-twisting spindles; but the dummies S are so located that when they are turned upward into position for use they will be out of the path of travel of the slats. This location of the dummy mechanism out of the path of travel of the slats is of importance, first, because it allows for the continuous feed of the slats into the machine, and, second, because in event of the breaking or jamming of the slat when partially fed into the machine the danger of the dummy contacting therewith is avoided. At one side of each of the dummies S extends a guide-rod 65, whereon the dummies will rest when out of action. Each dummy S is provided with a tailpiece $s^2$, the purpose of which will presently appear. Between the dummies S and mounted upon a lever T is the tripper-plate 70, (see Figs. 1 and 8,) the front portion of which plate extends above the tailpieces $s^2$ of the dummies. The lever T is suitably pivoted, as upon a rod $t$, extending beneath a table 72, over which the finished or woven mat or fabric will be delivered, and a spring 73 tends to draw downward the forward end of the lever T and with it the tripper-plate 70. The rear end of the lever T (see Fig. 8) carries a release-arm $T'$, that is adjustably mounted upon the tripper-lever T. To the hub of each of the dummies S is connected a cord 80, these cords being united together at their forward ends and passing over a pulley 81 at the front of the main frame, (see Fig. 3,) the cord 80 carrying a weight 82 sufficiently heavy to return the dummies to their former position after they have been moved away therefrom and have been released from the mat, as will presently appear. The spring 73, pulling downward upon the forward end of the tripper-lever T, forces the tripper-arm $T'$ against the under side of the finished mat as it passes over the table 72, (the table being furnished with a central opening to permit the arm $T'$ to bear against the under side of the mat.) When, therefore, a sufficient length of fabric has been woven to constitute the body of a barrel, an opening between the slats (formed by a previous operation of the dummy) will come above the tripper-arm $T'$ and will permit this arm to rise between the opening in the slats under the strain of the spring 73 and will permit the forward end of the tripper-lever T and the plate 70, carried thereby, to be drawn downward. As the plate 70 is thus drawn downward it will strike the tails $s^2$ of the dummies S and will turn these dummies about the pivot-rods 60 until the heads of the dummies are in the plane of lateral movement of the slats and the blades $s'$ of the dummies (if such blades be used) are between the arms $C'$ and $C^2$ of the wire-twisting spindles; but as the heads and blades of the dummies are outside the longitudinal path of travel of the slats they will not interfere with the feeding of the slats between the arms of the spindles. As the next slat is fed into the machine, after the dummies have been thus brought to position for use and the pushers E are advanced, the heads of the dummies will form a space between the slat last fed in and the slat that preceded it. The pushers E in imparting lateral movement to the slats will cause the dummies S to slide along the rods 60; but as the dummies thus slide along the rods 60 they will contact with the inclined side edges 76 of the tripper-plate 70. As the dummies thus move along the side edges of the tripper-plate 70 they will be forced back to the position shown by full lines in Fig. 2, and the heads and blades of the dummies S will thus be freed from engagement with the mat. As soon as the dummy heads and blades are thus freed the weight 82 (see Fig. 3) will cause the dummies S to return to the normal position shown in Figs. 1, 2, and 3 of the drawings. It is manifest that instead of automatically throwing the dummy mechanism into action by means of the tripper-arm T' entering an opening in the woven mat the spring 73 and the tripper-arm T' may be removed and the tripper-lever T may be actuated by hand whenever the operator finds that a desirable length of mat has been woven. I prefer, however, to operate the dummy mechanism automatically, as above described.

It is manifest that the details of construction above set forth may be varied within wide limits without departing from the spirit of the invention and that features of the invention may be employed without its adoption in entirety.

Having thus described my invention, what I claim as new, and desire to secure by Letters Patent, is—

1. In a machine for forming slat-and-wire fabric, the combination of a spool for carrying the binding or tie wire, a tubular guide or support passing through said spool, and having an opening from end to end thereof through which the main wire will travel, and means for revolving said spool.

2. In a machine for forming slat-and-wire fabric, the combination of a spool for carrying the binding or tie wire, a tubular guide or support passing through said spool, and having an opening from end to end thereof and whereon said spool is frictionally held, and means for revolving said spool.

3. In a machine for forming slat-and-wire fabric, the combination of a spool for carrying the binding or tie wire, a tubular guide or support passing through said spool and having an opening from end to end thereof, through which the main wire will travel, said guide or support having a free end over which the spool may be slipped.

4. In a machine for forming slat-and-wire fabric, the combination of a spool for carrying the binding or tie wire, a tubular guide or support passing through said spool and having a free end whereon said spool is removably mounted, a journal-bearing for said guide or support at one side of said spool, and means for imparting revolution to said guide or support and to said spool.

5. In a machine for forming slat-and-wire fabric, the combination of a spool for carrying the binding-wire, a tubular guide passing through said spool and having a straight opening therethrough through which the main wire will travel, and a revoluble guide-arm whereby the wire will be led from said spool, and means for revolving said spool.

6. In a machine for forming slat-and-wire fabric, the combination of a spool for carrying the binding-wire, a tubular guide passing through said spool and having an opening from end to end through which the main wire will travel, and whereby said spool will be driven, a guide-arm mounted upon said tubular guide and extending over said spool to lead the wire therefrom, and means connected to said tubular guide for revolving the same.

7. In a machine for forming slat-and-wire fabric, the combination of a spool for carrying the binding-wire, a tubular guide passing through said spool and whereby said spool is driven, and a spring interposed between said spool and said tubular guide, and means for revolving said tubular guide.

8. In a machine for forming slat-and-wire fabric, the combination of a spool for carrying the binding-wire, a tubular guide passing through said spool through which the main wire will travel, means for revolving said spool, a wire-twisting spindle having a central hole for the main wire and an eccentric hole for the binding-wire and gear mechanism for driving in unison said spool and said twisting-spindle.

9. In a machine for forming slat-and-wire fabric, the combination with a wire-twisting spindle for twisting a binding or tie wire around a main wire, of a spool for carrying the binding or tie wire, a tubular guide or support passing through said spool and through which the main wire will travel, said guide or support being independent of and separate from the twisting-spindle and means for revolving said spool.

10. In a slat-and-wire fabric machine, a wire-twisting spindle provided with a central opening for the main wire and with an eccentric opening for the binding-wire and provided with separate arms between which the slats will be delivered, said arms being formed with channels for the wires, the arm that supports the binding-wire being provided at its end with an antifriction-roll.

11. In a machine for forming slat-and-wire fabric, the combination with mechanism for feeding the slats, of dummy mechanism for forming spaces between the slats, said dummy mechanism being located out of the path of longitudinal travel of the slats, and means for throwing said dummy mechanism into position to form the spaces between certain slats.

12. In a machine for forming slat-and-wire fabric, the combination with mechanism for feeding the slats, of dummy mechanism for spacing the slats, said dummy mechanism being located out of the path of longitudinal travel of the slats and means for automatically throwing said dummy mechanism in position to form the desired spaces between certain slats.

13. A machine for forming slat-and-wire fabric, the combination with the mechanism for feeding the slats into the machine, of dummies for forming spaces between certain slats, said dummies being pivotally located to swing outside the path of longitudinal travel of the slats, and means for swinging said dummies between the slats when the desired spaces between the slats are to be formed.

14. In a machine for forming slat-and-wire fabric, the combination with mechanism for feeding the slats into the machine and with wire-twisting spindles, of dummy mechanism for forming spaces between certain slats, said dummy mechanism being located out of the path of longitudinal travel of the slats, and means for automatically throwing said dummy mechanism from between the slats after the desired spaces have been formed.

15. In a machine for forming slat-and-wire fabric, the combination with mechanism for feeding the slats into the machine and with wire-twisting spindles, of pivoted dummies located outside the longitudinal path of travel of the slats, means for swinging said dummies about their pivots to effect the desired spaces between certain slats, and means for automatically withdrawing said dummies from between the slats and returning said dummies to normal position.

16. In a machine for forming slat-and-wire fabric, the combination with a wire-twisting spindle and mechanism for intermittently revolving said spindle in one and the same direction, said spindle being provided with a concentric opening for the main wire and with an eccentric support for the binding or tie wire, of a spool for carrying said binding or tie wire, a tubular guide passing through said spool through which the main wire will travel, and means for continuously revolving said spool in the direction of revolution of the wire-twisting spindle.

17. In a machine for forming slat-and-wire fabric, the combination with a wire-twisting spindle, of mechanism for intermittently revolving said spindle in one and the same direction, comprising a continuously-moving shaft, gear mechanism leading from said shaft to the spindle, a clutch disk and wheel upon said shaft, a pivoted dog for engaging said clutch-wheel carried by said disk, and an arm for throwing said dog out of action.

18. In a machine for forming slat-and-wire fabric, the combination with a wire-twisting spindle, of mechanism for intermittently revolving said spindle in one and the same direction, comprising a continuously-moving shaft, gear mechanism connecting said shaft to the spindle, a clutch disk and wheel upon said shaft, a pivoted dog carried by said disk for engaging said clutch-wheel, an arm for releasing said dog from engagement with said clutch-wheel, and a supplemental stop for checking the back-throw of said clutch-disk.

JOSEPH REIF, JR.

Witnesses:
GEORGE P. FISHER, Jr.,
ALBERTA ADAMICK.